United States Patent [19]

Hoffman

[11] 4,247,234

[45] Jan. 27, 1981

[54] PIPE GROOVING TOOL

[75] Inventor: Joseph W. Hoffman, Liverpool, Pa.

[73] Assignee: AMP Incorporated, Harrisburg, Pa.

[21] Appl. No.: 81,305

[22] Filed: Oct. 2, 1979

[51] Int. Cl.³ .................... B23D 43/06; B23D 21/10
[52] U.S. Cl. ........................................ 409/260; 30/95
[58] Field of Search ............. 409/260, 175, 180, 181; 30/92, 93, 94, 95, 96, 100, 101; 82/4 C

[56] References Cited

U.S. PATENT DOCUMENTS

| 860,711 | 7/1907 | Vosper | 30/94 |
| 1,763,299 | 6/1930 | Galbraith | 30/95 |
| 3,714,712 | 2/1973 | Hoffman | 30/95 |
| 4,078,304 | 3/1978 | Netzel | 30/101 |

FOREIGN PATENT DOCUMENTS

| 129639 | 4/1902 | Fed. Rep. of Germany | 30/95 |
| 338482 | 6/1921 | Fed. Rep. of Germany | 30/94 |
| 643117 | 9/1950 | United Kingdom | 30/95 |

*Primary Examiner*—William R. Briggs
*Attorney, Agent, or Firm*—Allan B. Osborne

[57] ABSTRACT

The present invention relates to a relatively small hand-held tool for cutting grooves in the ends of small diameter pipe and for sizing the outside diameter for a predetermined length. More particularly the tool has a drive housing in which cutting blades are located and a pipe housing, pivotally connected to the drive housing, in which the pipe end is positioned. A coil spring, acting against both housings, provides the blade pressure on the pipe. Grooving is done by rotating the tool about the pipe.

2 Claims, 2 Drawing Figures

PIPE GROOVING TOOL

BACKGROUND OF THE INVENTION

1. Field of the Invention

The present invention relates to portable, lightweight and manually operated tools for cutting grooves in the external surface of pipe ends and for sizing the outside diameter of the pipe end.

2. Prior Art

U.S. Pat. No. 3,714,712, assigned to the same assignee as is this application, represents the most relevant prior art known to me. The tool disclosed therein, invented by me, has a cylindrical housing to receive the pipe end, a set of grooving or cutting blades pivotally mounted and spring loaded, and is rotated about the pipe to cut the grooves. The present invention represents a novel improvement over the aforementioned tool.

SUMMARY OF THE INVENTION

The present invention has a pipe receiving housing with a laterally extending platform and a lateral opening. A drive housing is pivotally connected to the pipe receiving housing so that a cutting blade may be moved in and out of the opening. Biasing means, acting between the platform and drive housing, provides pressure on the blade.

DESCRIPTION OF THE INVENTION

Figure 1:
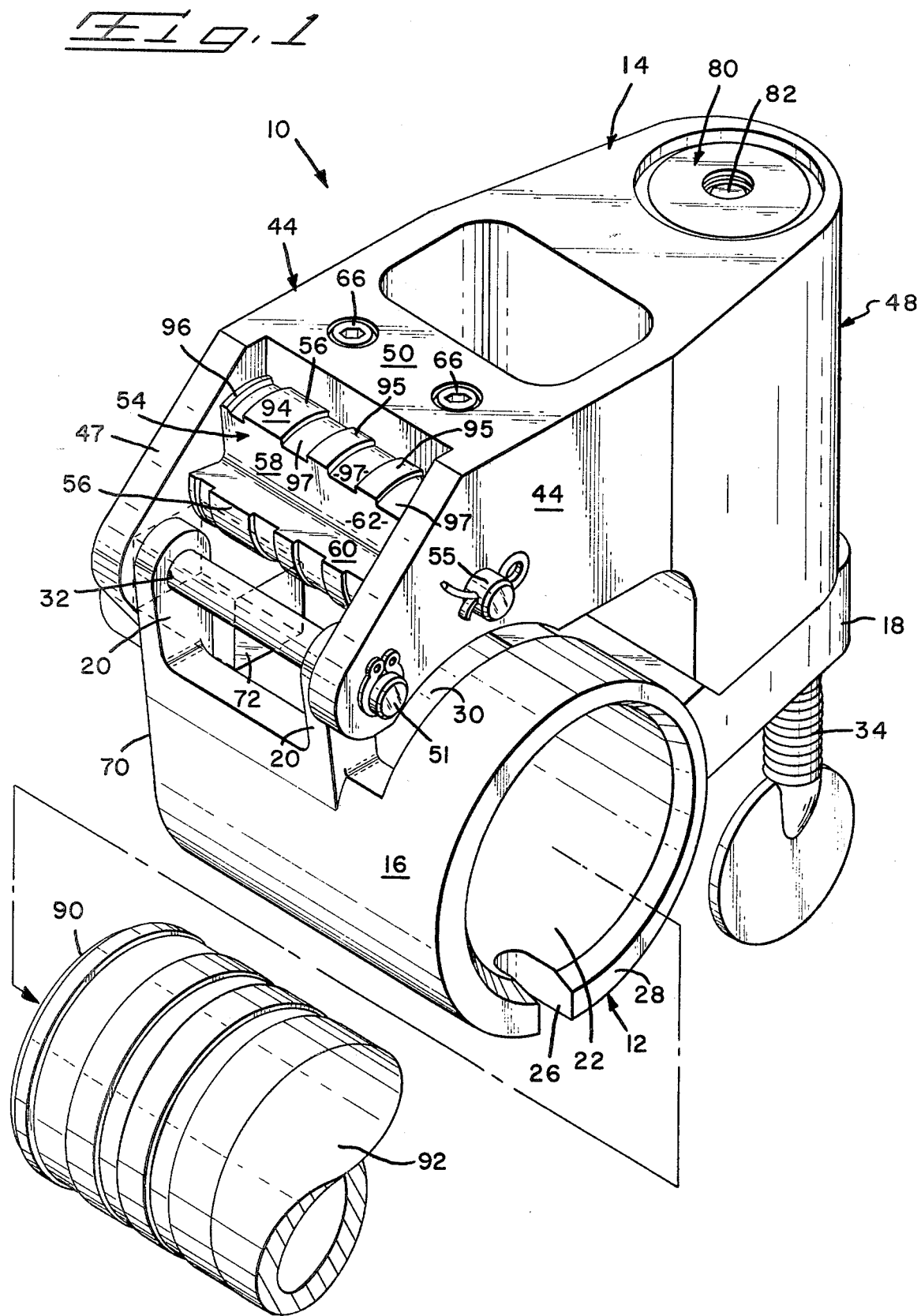
FIG. 1 is a perspective view of the preferred embodiment of the present invention.

With reference to both figures, pipe grooving tool 10 has two major and separable components: pipe receiving housing 12 and drive housing 14.

Pipe receiving housing 12 includes a cylindrical section 16, a laterally extending platform 18 and a pair of spaced apart ears 20 projecting away from section 16.

Cylindrical section 16 has a pipe receiving passage 22, the diameter of which is eccentric. With specific reference to FIG. 2, the lower left quadrant, indicated by reference numeral 24 and divided from the rest of the passage by dashed lines, has a diameter equal to the outside diameter of the largest size pipe to be grooved. The diameter of the remaining passage is slightly larger to permit easy pipe insertion. During grooving, the pipe bears against this 90 degree section to prevent pipe chatter.

A cradle, not shown here but shown and described in U.S. Pat. No. 3,714,712, fits into passage 22 so that the tool may groove smaller diameter pipe. A thumb screw threadedly attached to the cradle, slides into notch 26 which is located in the lower half of the cylindrical section and at the front face 28 of passage 22.

The beveled surface at the passage's front face facilitates sliding the pipe into the section.

A window 30 is cut into the top half of cylindrical section 16 and extends rearwardly to the end of the section. As shown in FIG. 1, ears 20 are located along one longitudinal edge of the window. Preferably the window spans about 100 degrees of the section's diameter.

A hole 32 is located in each ear 20 adjacent its free end.

Figure 2:
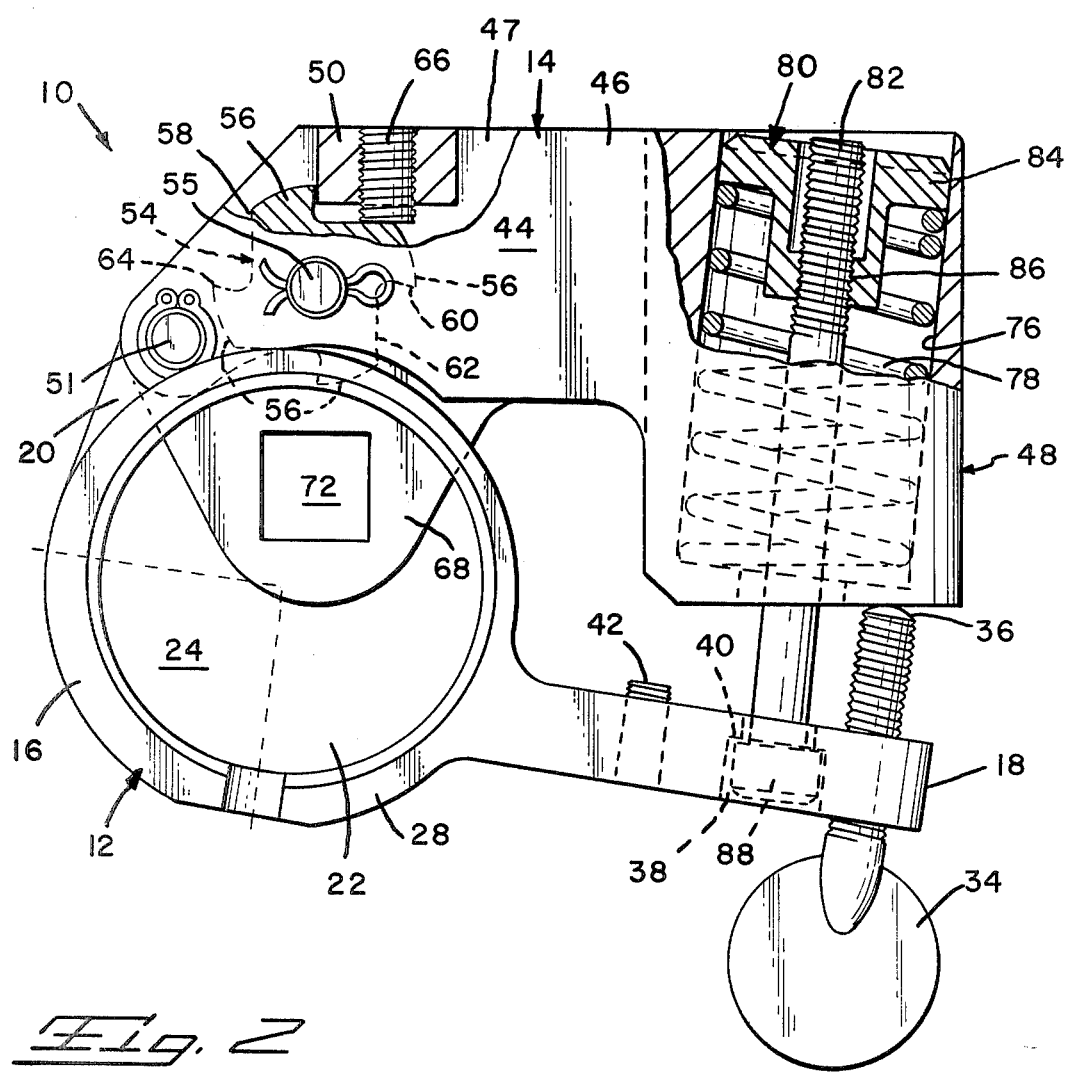
FIG. 2 is a side elevation view, partially sectioned to illustrate the biasing means.

With reference to FIG. 2, a threaded hole is provided adjacent the free end of platform 18. Thumb screw 34 is threadedly positioned in that hole with the shank-end 36 extending above.

A second hole in the flange, indicated by reference numeral 38, is positioned inwardly from the threaded hole towards the cylindrical section. This hole is counterbored to provide a downwardly facing shoulder 40.

A third hole is located still further in towards section 16. This hole is threaded and contains a conventional set screw 42.

Drive housing 14 is L-shaped with one section containing the cutting blade and the other section containing means for biasing the cutting blade against the pipe.

The first section referred to above is indicated generally on the drawings by reference numeral 44. This section comprises two elongated arms 46 and 47 extending forwardly from their attachment to the second section; said section being indicated by reference numberal 48. Brace 50, bridges the arms about midway between section 48 and the arm's free ends. The cut-away in FIG. 2 shows the brace as well as one of the two set screws 66 threadedly located therein.

A pin 51, passing through holes in the arm's free ends and ears 20, pivotally connect the drive housing to the pipe receiving housing. The pin is secured against longitudinal movement by circlips 52 located on either end in the conventional manner.

The cutting blade, indicated generally by reference numeral 54, is positioned on pin 55 between the two arms just behind pin 51. With reference to FIG. 2 wherein the blade is shown in phantom, it can be seen that there are four separate surfaces 56, each surface separated from another by a notch 58 extending along the length of the blade. The notches have two distinct sides, short side 60 and long side 62. The short side is a curving surface so that the cutting edge, designated by reference numeral 64, projects forwardly. The long side 62 provides a surface against which set screws 66, can abut up against.

The cutting blade is secured against movement by a short side 60 bearing against a surface of brace 50 and set screws 66 bearing against the long side. The cut-away in FIG. 2 shows this arrangement which positions a cutting edge in window 30.

A nose 68 extends downwardly from arm 47 to partially block the rear face 70 of the cylindrical section. A square opening 72 is located in the nose to receive the drive stud (not shown) found on commercially available ratchet wrenches.

Referring now to FIG. 2 primarily, section 48 of the drive housing contains a well 76 in which a coil spring 78 is located. The spring is confined within the well by cooperation between retainer 80 and bolt 82 which extends up from platform 18. The retainer is cup-shaped with a wide brim 84 and a threaded hole 86 which receives the threaded shank of bolt 82. The bolt head 88 abuts against the downwardly facing shoulder 40 in platform 18. As shown, the spring is retained between the retainer's wide brim and the bottom of the well. The spring's tension may be changed simply by rotating the bolt to increase or decrease the spring's length.

Referring to FIG. 1, surfaces 56 of grooving blade 54 reflect the nature of the grooves cut into the pipe.

In addition to the one wide and two narrow lands 94 and 95 respectively, the very narrow cutting land 96 on the blade adjacent arm 47 provides a blade to at a chamfer 90 on the very end of pipe 92 shown in FIG. 1.

The grooves 97, located between the lands on the blade, provide cutting edges which size the outside diameter of the pipe to the correct dimension. For example, the pipe may be warped or have a layer of tar, dirt or the like thereon. The blade's grooves cut-away any foreign material as well as bring the pipe into true round. Of course, the blade may have any number and shape of cutting edges as required.

The two components of tool 10 are assembled by pin 51 passing through the arms on the drive housing and holes 32 in the ears on the pipe receiving housing. Further, the second section of the drive housing is movably attached to the platform on the pipe receiving housing via bolt 88.

Being so assembled, the drive housing is pivoted on pin 51 by turning thumb screw 34. Obviously the cutting edges of the blade is moved into and out of window 30 in this manner.

In operation, thumb wheel 34 is rotated clockwise to push against section 48 and pivot the drive housing counter clockwise on pin 51. This lifts the cutting blade away from window 30 so that pipe 92 may be inserted into the cylindrical section's passage 22 to where it abuts nose 68. The thumb screw is then rotated counterclockwise to allow the drive housing, under the expansion force of the coil spring, to pivot clockwise so that the cutting blade contacts the pipe through window 30. Thereafter a ratchet wrench is placed in opening 72 to rotate tool 10 about the pipe counterclockwise so that cutting edges 64 can cut the grooves and size the pipe. Coil spring 78 continuously forces the cutting edges deeper into the pipe. As the grooves are being cut, drive housing 14, under the force of the spring, moves clockwise until section 48 abuts set screw 42; the set screw being previously set at a height so that the grooves on the pipe go in only to a predetermined depth and so that the outside diameter is correctly sized. Thereafter the drive housing can be again pivoted counterclockwise by means of thumb screw 34 to disengage the grooving blade from the pipe.

It is to be understood that the forms of the invention shown and described herein are but preferred embodiments thereof and that various changes and modifications can be made therein without departing from the spirit or scope of the invention.

What is claimed is:

1. A tool for cutting external grooves on a pipe and for sizing its outside diameter, comprising:
   a. a cylindrical housing having a pipe encircling and receiving passage with an eccentrical diameter and with a window opening thereinto and having only a portion thereof corresponding to the diameter of the largest pipe to be grooved and further an elongated platform extending laterally therefrom;
   b. a drive housing pivotally attached to the cylindrical housing and consisting of a pair parallel arms extending laterally from a generally cylindrical, cavity containing section, the free ends of said arms being adjacent to the window and the free end of said cavity containing section extending towards the free end of the elongated platform;
   c. a cutting blade mounted between the two parallel arms in alignment with the window;
   d. a coil spring positioned in the cavity; and
   e. connecting means attached to and extending between the coil spring and platform so that the compressive forces of the spring urges the drive housing and the free end of the platform towards the other causing the cutting blade to enter the window and engage a pipe which may be positioned in the pipe-receiving passage.

2. The tool of claim 1, wherein the cutting blade has a plurality of cutting surfaces, with each surface separated by a notch with one side of each notch being curved so that the cutting edge on the cutting surface overhangs the notch.

* * * * *